(12) United States Patent
Manuel-Devadoss

(10) Patent No.: US 12,333,027 B2
(45) Date of Patent: Jun. 17, 2025

(54) MACHINE LEARNING FOR IMPLEMENTING POLICIES IN A COMPUTING ENVIRONMENT

(71) Applicant: Oracle International Corporation, Redwood Shores, CA (US)

(72) Inventor: Johnson Manuel-Devadoss, San Antonio, TX (US)

(73) Assignee: Oracle International Corporation, Redwood Shores, CA (US)

( * ) Notice: Subject to any disclaimer, the term of this patent is extended or adjusted under 35 U.S.C. 154(b) by 678 days.

(21) Appl. No.: 17/685,561

(22) Filed: Mar. 3, 2022

(65) Prior Publication Data
US 2023/0283643 A1    Sep. 7, 2023

(51) Int. Cl.
G06F 21/60    (2013.01)
G06F 18/21    (2023.01)
G06N 3/092    (2023.01)
H04L 9/40     (2022.01)

(52) U.S. Cl.
CPC ........ G06F 21/604 (2013.01); G06F 18/2185 (2023.01); G06N 3/092 (2023.01); H04L 63/20 (2013.01)

(58) Field of Classification Search
CPC ........ G06F 21/604; H04L 63/20; G06N 3/092
See application file for complete search history.

(56) References Cited

U.S. PATENT DOCUMENTS

| | | | |
|---|---|---|---|
| 8,353,001 B2 | 1/2013 | Herrod | |
| 11,610,153 B1* | 3/2023 | Herzog | G06N 3/006 |
| 2013/0247136 A1 | 9/2013 | Chieu et al. | |
| 2016/0063209 A1* | 3/2016 | Malaviya | G16H 50/50 706/12 |
| 2020/0193058 A1* | 6/2020 | Vaidhyanathan | G06F 21/552 |
| 2021/0067556 A1* | 3/2021 | Tahan | H04L 63/0263 |
| 2021/0248252 A1 | 8/2021 | Darji | |
| 2021/0319313 A1* | 10/2021 | Warren | G06N 3/08 |
| 2022/0150281 A1* | 5/2022 | Kanungo | G06F 16/9024 |
| 2022/0166625 A1* | 5/2022 | Stefanich | H04L 9/3221 |
| 2022/0191248 A1* | 6/2022 | Pieczul | H04L 63/0227 |

(Continued)

OTHER PUBLICATIONS

"A Solution to Automate Security, Compliance, and Auditing in AWS," Amazon Services, Nov. 2015, pp. 1-13.

(Continued)

*Primary Examiner* — David J Pearson
(74) *Attorney, Agent, or Firm* — Invoke

(57) ABSTRACT

Techniques for implementing policies in resources of a computing environment are disclosed. A machine learning model selects and implements policies on one or more resources in a computing environment. The machine learning model identifies characteristics associated with operations to be performed by the one or more resources. The machine learning model selects a particular policy to apply to the one or more resources based on the characteristics associated with the operations to be performed by the one or more resources. Another neural network associated with deep reinforcement learning selects a sequence of actions to apply to resources in the computing environment to implement the policies or standards in the computing environment.

14 Claims, 7 Drawing Sheets

(56) References Cited

U.S. PATENT DOCUMENTS

2023/0185932 A1* 6/2023 Alhussein ............... G06N 3/08 726/26

OTHER PUBLICATIONS

"Build and manage assessments in Compliance Manager," Microsoft, Mar. 2022, pp. 1-11.
"Compliance Manager templates list," Microsoft, 2021, pp. 1-15.
"Getting started with Security and Compliance Center," IBM, Mar. 2022, pp. 1-5.
"Hyperproof—Compliance automation," Hyperproof, Sep. 2021, pp. 1-12.
"Security Management Solution Guide," Solution Guide, 2014, pp. 130.
"Using NLP-based machine learning to automate compliance and risk governance," NSFOCUS, May 2019, pp. 1-6.
"Why automate security and compliance," Red hat, Dec. 2018, pp. 1-12.
Ghaisas S., "Towards automating the security compliance value chain," Towards automating the security compliance value chain, 2015, pp. 1014-1017.
Swamy N. et al., "Updated AWS CloudFormation Deep Learning Template Adds New Features and Capabilities," AWS Machine Learning Blog, Mar. 2017, p. 1.
Wong T., "How security and compliance automation can help achieve a more secure hybrid cloud," Red Hat Blog, Nov. 2020, pp. 1-8.

* cited by examiner

MACHINE LEARNING FOR IMPLEMENTING POLICIES IN A COMPUTING ENVIRONMENT

TECHNICAL FIELD

The present disclosure relates to applying machine learning to implement policies in a computing environment. In particular, the present disclosure relates to using performing deep reinforcement learning to generate a sequence of operations to implement predefined policies or standards in a computing environment.

BACKGROUND

Cloud computing enables enterprises to efficiently provision and modify computing resources in a distributed computing environment. A distributed computing environment may include a large number of components, including compute nodes and application nodes. Generally, nodes refer to systems or devices connected to another system or device. Compute nodes include, for example, physical machines, virtual machines (VMs), and data storage. Application nodes include, for example, end-user applications, user interfaces, database applications, middleware applications, and search engine applications. Each node is associated with a set of configurations. The configurations affect how the nodes are implemented (such as, node type, shape, disk space, domain, subnet). Additionally, or alternatively, the configurations affect how the nodes communicate with each other (such as, dependencies, Internet Protocol (IP) address of a node itself, IP addresses of dependent or requisite nodes).

As cloud computing becomes more prevalent, it is increasingly important that cloud computing providers be able to identify and implement security standards for the different computing environments of different enterprises. Cloud computing providers rely on highly-trained human experts to build and maintain secure cloud-based computing environments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
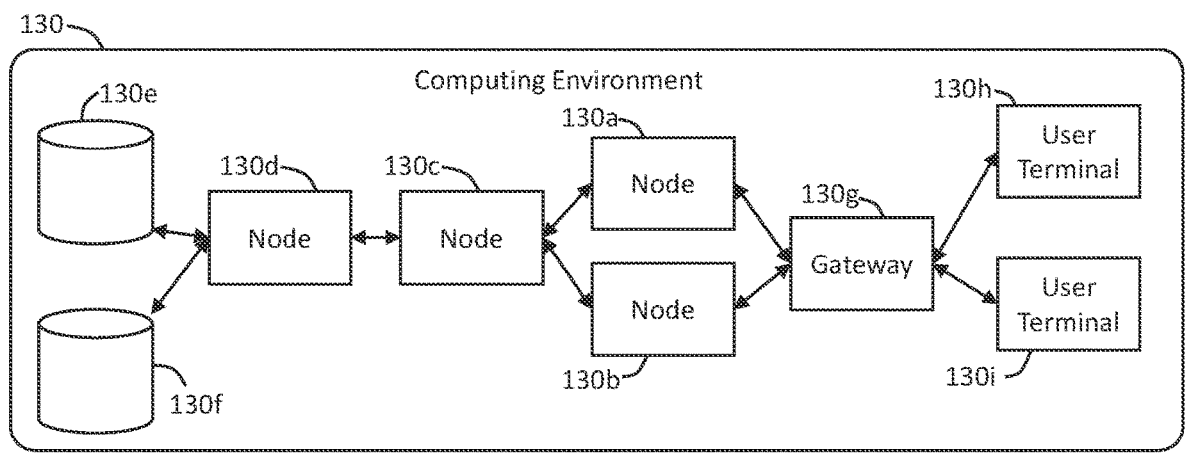
FIG. 1 illustrates a system in accordance with one or more embodiments.
Figure 1:
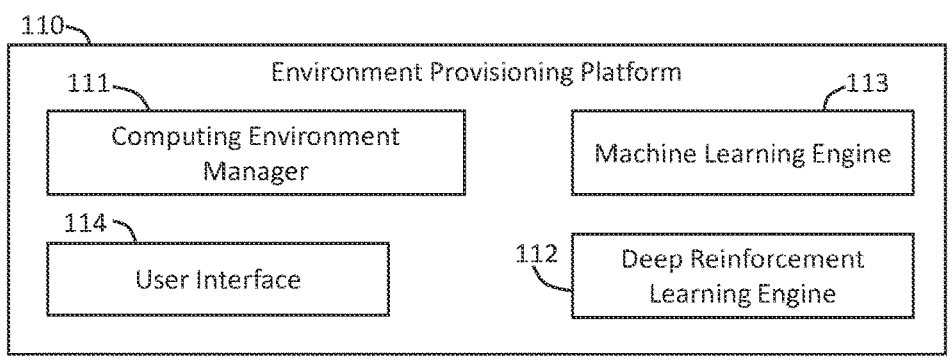
Figure 1:
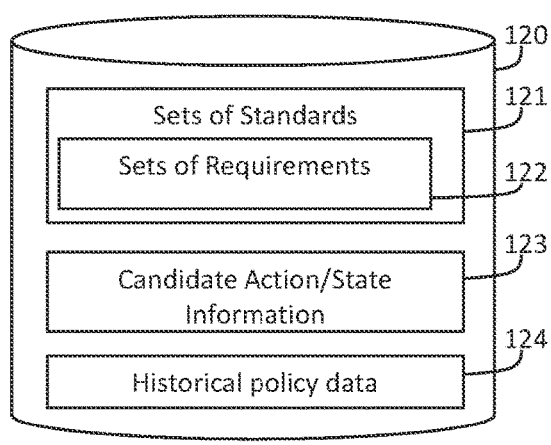

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. IMPLEMENTING DATA SECURITY POLICIES IN COMPUTING RESOURCES USING MACHINE LEARNING
4. USING DEEP REINFORCEMENT LEARNING TO APPLY SECURITY STANDARDS TO A COMPUTING ENVIRONMENT
5. TRAINING A MACHINE LEARNING MODEL TO APPLY AN ACTION-SELECTION POLICY IN A DEEP REINFORCEMENT LEARNING PROCESS
6. TRAINING A MACHINE LEARNING MODEL TO SELECT POLICIES BASED ON OPERATIONS IN A COMPUTING ENVIRONMENT
7. EXAMPLE EMBODIMENT
8. COMPUTER NETWORKS AND CLOUD NETWORKS
9. MISCELLANEOUS; EXTENSIONS
10. HARDWARE OVERVIEW

1. GENERAL OVERVIEW

Computing environments include different types of resources for execution of functions and operations. The resource(s) may include, for example, servers, databases, and communication channels comprised in a computing environment. One or more embodiments apply machine learning to select and implement policies on resources in a computing environment. According to one embodiment, a policy-selection neural network selects policies to apply to resources in a computing environment based on operations to be performed by the resource(s). The system identifies characteristics associated with operations to be performed by the resource(s). The system applies the policy-selection neural network to the characteristics to generate a policy to apply to the one or more resources for execution of the operations. For example, the neural network may be trained to select a particular data security compliance policy to apply to a subset of messages transmitted to a server based on a source device being located in a particular country. Other operation characteristics, used by the policy-selection neural network, may include but are not limited to a type of operation performed by a resource, an entity associated with the operation, and an application associated with the operations (e.g., a security check) and/or configurations for the resources for execution of the operations.

One or more embodiments perform deep reinforcement learning to generate a sequence of operations to apply a policy or standard to a computing environment. The system iteratively provides a deep reinforcement learning agent with a state, associated with characteristics of a computing environment, and a set of actions associated with the state. The agent selects an action to apply to the state to generate a next state. The system provides the agent with the next state and another set of candidate actions to apply to the next state. The agent selects an action to apply to a particular state based on a reward value associated with a next state generated by applying the action to the state. The agent may select an action to apply to a state of a computing environment based on (a) a reward value of a candidate next state associated with a candidate action, (b) a discount factor or penalty associated with the candidate next state, and (c) an estimate of an optimal future value of future next states that follow from the particular candidate next state. As a result of iteratively selecting actions to apply to states of the computing environment, the system generates a sequence of actions to apply to a sequence of states. The system applies the sequence of actions to the computing environment to modify the computing environment to comply with a set of requirements associated with a particular standard. For example, the set of requirements may be associated with a data security standard, a data communication standard, or a standard for hardware (such as a safety standard or a performance standard) to be used in a particular computing environment.

One or more embodiments implement the agent as an action-selecting neural network. The system trains the neural network with a training data set made up of a set of sequences of actions applied to respective sequences of states of the computing environment. The system trains the neural network to select an action, from among a set of candidate actions, to apply to a particular state of the computing network. By iteratively selecting actions to generate different sequences of actions, the neural network learns an action-selection policy that corresponds to a highest reward value for a sequence of actions.

One or more embodiments described in this Specification and/or recited in the claims may not be included in this General Overview section.

2. SYSTEM ARCHITECTURE

FIG. 1 illustrates a system 100 in accordance with one or more embodiments. As illustrated in FIG. 1, system 100 includes an environment provisioning platform 110. The environment provisioning platform 110 provisions a computing environment 130, such as a cloud-based computing environment. Provisioning the computing environment 130 includes giving an entity—such as an individual or an enterprise—access to physical and software resources in a cloud environment. For example, a user belonging to a particular entity may connect from a user terminal 130*h* to cloud-based resources of the computing environment 130 to run applications in the computing environment 130 and transfer data between components of the computing environment and the user terminal 130*h*.

In one or more embodiments, an environment provisioning platform 110 refers to hardware and/or software configured to perform operations described herein for provisioning and/or modifying characteristics of a computing environment using machine learning to implement a security policy in the security environment. Examples of operations for applying machine learning to resources in a computing environment to implement data security standards in the computing environment are described below with reference to FIG. 2.

In an embodiment, the environment provisioning platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the computing environment 130 is a cloud-based computing environment. For example, any of the components 130*a*-130*g* may be hosted by one or more devices, such as servers. The devices, such as servers, may host one or more additional computing environments 130. One computing environment may be accessible by one tenant, and the other computing environment, sharing at least a portion of the same hardware devices, is accessible by another tenant. A tenant is a corporation, organization, enterprise or other entity that accesses a shared computing resource, such as components 130*a*-130*g* or applications running on components 130*a*-130*g*.

The system also includes a data repository 120. In one or more embodiments, the data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the environment provisioning platform 110. Alternatively, or additionally, the data repository 120 may be implemented or executed on a computing system separate from the environment provisioning platform 110. A data repository 104 may be communicatively coupled to the environment provisioning platform 110 via a direct connection or via a network.

Information describing the data stored in the data repository 120 may be implemented across any of components within the system 100. However, this information is illustrated within the data repository 120 for purposes of clarity and explanation.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The environment provisioning platform 110 includes a computing environment manager 111. The computing environment manager 111 identifies available resources in a computing environment and configures the available resources to perform particular functions. For example, the computing environment manager 111 configures components 130a-130f of the computing environment 130 to (a) communicate with each other via particular communication channels, and (b) perform particular storage and computing functions. For example, the computing environment manager may configure the components 130a-130f to give user terminals 130h and 130i access to data stored in the databases 130e and 130f via a gateway 130g by accessing applications on one or more of the nodes 130a-130d.

In one or more embodiments, the computing environment 130 includes a set of compute nodes. In the system 100 illustrated in FIG. 1, one or more of the components 130a-130f may be a compute node. A compute node is a resource on which an application node is executed. Examples of compute nodes include a physical machine, a virtual machine (VM), and a data storage device. Each compute node is associated with a set of configurations. Various compute node configurations may be used. A compute node configuration may include an operating system (OS). Examples of OS's include Linux and Windows. A virtual machine is a digital version of a physical computer. Virtual machine software is executed on a host hardware device including a hardware processor and memory. Multiple virtual machines may run on the same host hardware device. Although multiple virtual machines run on the same host hardware device, the virtual machines execute operations independently of each other. Virtual machine software runs programs and operating systems, stores data, connects to networks, and performs other computing functions.

A compute node configuration may be based on application nodes to be deployed. For example, one option for a compute node configuration may be a database (DB) system, which is a system for running a general database. Another option for a compute node configuration may be database applications, which is an application-specific database on top of a database system. Another option for a compute node configuration may be a search application, which is an application for searching a database application. Another option for a compute node configuration may be full-tier application nodes, which includes a database, an application server, and a web server. Another option for a compute node configuration may be middle-tier application nodes, which includes an application server, and a web server. Another option for a compute node configuration may be a client, which includes client components used to deploy a computing environment.

A compute node configuration may be described as having a node shape. If the node is a VM, then the node may be associated with a VM shape. If the node is a bare metal (BM) system, then the node may be associated with a bare metal shape. A compute node configuration may characterize a size of a disk space, such as 256 GB, 512 GB, 1024 GB, or any other size.

In one or more embodiments, a computing environment includes a set of application nodes. An application node executes on a compute node. Examples of application nodes include a DB application, an application server, a web server, a search application. A particular set of one or more application nodes may be specified in a deployment package (DPK). In the present specification and claims, the term "components" may refer to both compute nodes and application nodes. In other words, the term "component of a computing environment" refers to compute nodes or application nodes in the computing environment, and to the devices, systems, connections, and applications that make up the compute nodes and application nodes in the computing environment.

Each application node is associated with a set of configurations. Various application node configurations may be used. An application node configuration may be a subnet used for implementing the application node. The subnet may be part of a cloud network used for implementing the computing environment as a whole. Application node configurations may include a region and an availability domain. A region is a localized geographic area, and an availability domain is one or more data centers located within a region. A region is composed of several availability domains.

Application node configurations may include a subnet, a listener port number, a connect identifier (ID), a Uniform Resource Identifier (URI) or file path, an operator ID, an access ID, a DB name, a Pluggable Database name, an administrator username, a web server domain, an authentication domain, a hypertext transfer protocol (HTTP) port, a hypertext transfer protocol secure (HTTPS) port, a Jolt port, a WSL port.

In one or more embodiments, a computing environment is implemented on using one or more data volumes. The data volumes store binary files and/or application data associated with compute nodes and/or application nodes. Binary files include executable code of a compute node and/or an application node. Application data includes data obtained by a compute node and/or an application node through an application programming interface (API) and/or user interface. Application data also includes data derived from other data obtained by a compute node and/or an application node through an application programming interface (API) and/or user interface. As an example, for an application node executing a human capital management application, application data may include names and biographical information of employees of a company, and a number of employees per office location. As another example, for an application node executing a financial management application, application data may include financial transactions of a company, and a balance of the company.

In one or more embodiments, the computing environment manager 111 manages the computing environment 130 by provisioning and/or modifying the computing environment 130 by establishing data communication relationships between components 130a-130i, by specifying types of data stored in one or more components 130a-130i, and by configuring one or more applications to run on components 130a-130i.

In one or more embodiments, the computing environment manager 111 is configured to configure the components 130a-130g of the computing environment 130 to operate according to predefined sets of standards 121. For example, the computing environment manager 111 may identify a particular application running in the computing environment 130 that accesses patient health data. The computing environment manager 111 may determine that the components 130a-130g are required to comply with predefined standards for computer systems that store and allow access to patient health data, such as Health Insurance Portability and Accountability Act (HIPAA) security standards or Health Information Trust Alliance (HITRUST) security standards. According to another example, the computing environment manager 111 may identify a particular application running in the computing environment 130 that accesses financial data. The computing environment manager 111 may determine that the components 130a-130g are required to comply with predefined standards for computer systems that store and allow access to financial data, such as Payment Card Industry Data Security Standard (PCI DSS) security standards. According to another example, the computing environment manager 111 may identify a particular application running in the computing environment 130 that accesses data associated with national defense. The computing environment manager 111 may determine that the components 130a-130g are required to comply with predefined standards for computer systems that store and allow access to national defense data, such as National Institute of Standards and Technology (NIST) 800-171 security standards, Defense Federal Acquisition Regulation Supplement (DFARS) security standards, or Federal Risk and Authorization Management Program (FedRAMP) security standards. According to another example, a user may interact with the user interface 114 to provision a new computing environment. The user may select one or more data security standards to be applied to the new computing environment.

According to one or more additional embodiments, the computing environment manager 111 determines that one or more of the components 130a-130g is required to comply with hardware standards or standards for transmitting. For example, the computing environment manager 111 may identify a resource that should comply with Institute of Electrical and Electronics Engineers (IEEE) 802 standards (e.g., 802.1 through 802.12). For example, IEEE 802.3 specifies standards for Ethernet communications. The computing environment manager 111 may identify hardware, such as Ethernet ports and associated communication channels, required to implement Ethernet in the computing environment 130 according to the IEEE 802.3 standard. According to another example, the computing environment manager 111 may identify hardware, such as wireless ports and associated communication channels, required to implement a wireless local area network (LAN) in the computing environment 130 according to the IEEE 802.11 standard. While the above examples describe standards defined by authoritative standards-developing organizations, embodiments include locally-developed standards. For example, an enterprise may develop custom standards to be applied within the enterprise and by entities doing business with the enterprise for protecting, storing, and transmitting data.

In one or more embodiments, user interface 114 refers to hardware and/or software configured to facilitate communications between a user and the environment provisioning platform 110. Interface 114 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 114 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 114 is specified in one or more other languages, such as Java, C, or C++.

In one embodiment, the environment provisioning platform 110 includes a deep reinforcement learning engine 112. The deep reinforcement learning engine 112 generates a sequence of operations for provisioning and/or modifying the computing environment 130 to cause the computing environment 130 to comply with a defined set of standards 121. For example, a user may interact with the user interface 114 to indicate that the computing environment 130 should comply with HIPAA data security standards. The deep reinforcement learning engine 112 identifies the resources (e.g., components 130a-130i, software, programs, and data) present in the computing environment 130. The deep reinforcement learning engine 112 performs deep reinforcement learning to generate a sequence of operations to modify the resources of the computing environment 130 to comply with the HIPAA data security standards. The computing environment manager 111 implements the sequence of operations in the computing environment 130 to generate a modified computing environment. For example, the computing environment manager 111 may encrypt particular data stored in the database 130f with a particular type of data encryption. In addition, the computing environment manager 111 may add a firewall device to the computing environment 130 between the user terminals 130h/130i and the nodes 130a/130b. In addition, the computing environment manager 111 may configure security settings in the node 130a to restrict access to only a defined set of users having a particular authorization level. In addition, the computing environment manager 111 may schedule security scans of the computing environment 130 using specified anti-virus and anti-malware software at specified time intervals.

According to one or more embodiments, the deep reinforcement learning engine 112 applies action/state information 123 to an agent to select a particular action to take (i.e., a particular modification to the computing environment 130) based on the present state of the computing environment 130. The agent may be a machine learning model, for example. The agent is trained to receive a present state as an input and select an action, from among a plurality of candidate actions that could be applied to the present state, as an output. The action is applied to the present state to generate a next state. The next state is applied to the agent to select a next action. The process is repeated to generate a sequence of actions to be performed by the computing environment manager 111 to apply a particular set of standards 121 in the computing environment 130.

The environment provisioning platform 110 includes a machine learning engine 113. The machine learning engine 113 trains a machine learning model to function as the agent of the deep reinforcement learning by selecting actions to apply to a state of the computing environment 130. The action/state information 123 may include data regarding a plurality of candidate states of the computing environment (such as hundreds, thousands, tens of thousands, or hundreds of thousands of candidate states) in which different components of the computing environment have different characteristics. For example, one candidate state may include a resource having a particular encryption level. Another candidate state may include a set of resources operating a particular security program. Another candidate state may include a particular security device in the candidate state, while another candidate state may omit the particular security device. The machine learning engine 113 trains the machine learning model to select a particular action given a particular input candidate state.

According to another embodiment, the machine learning engine 113 may train a machine learning model to select particular policies to implement in the computing environment 130 based on particular operations that are to be performed in the computing environment 130. The machine learning engine may obtain historical policy data 124 including policies implemented associated with particular computing operations to train the machine learning model. For example, the machine learning engine 113 may train a machine learning model to select a particular security policy to implement based on identifying one or more of: a type of operation being performed by a device or system, an application running on a device, or an entity accessing a device or associated with the device.

Additional embodiments and/or examples relating to computer networks are described below in Section 8, titled "Computer Networks and Cloud Networks."

3. IMPLEMENTING DATA SECURITY POLICIES IN COMPUTING RESOURCES USING MACHINE LEARNING

Figure 2:
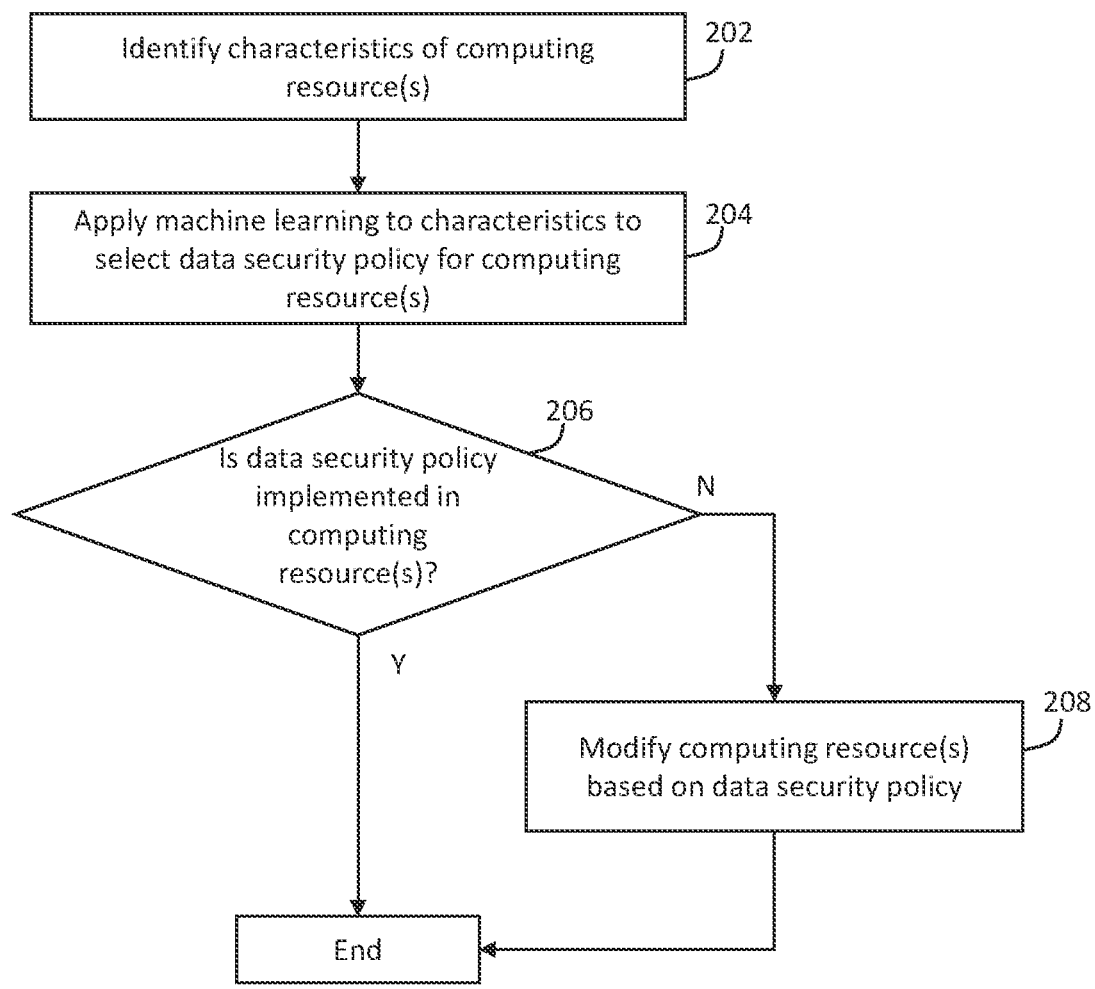
FIG. 2 illustrates an example set of operations for using deep reinforcement learning to apply security standards to a computing environments in accordance with one or more embodiments.

FIG. 2 illustrates an example set of operations for implementing data security policies in computing resources using machine learning, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system identifies characteristics of one or more computing resources (Operation 202). Examples of characteristics include: a number of resources, types of resources, and operations to be performed by the resources. For example, the system may identify a particular database that stores a particular type of information. In addition, the system may identify a particular server that runs virtual machines. One of the machines may run a particular application that accesses or modifies particular data. In addition, the system may identify a particular server in communication with a gateway device or user terminal. The system may identify characteristics for a computing system including one or more gateway devices, one or more load balancers, and multiple compute nodes, including one or more middle tier nodes, full tier nodes, application nodes, and database nodes.

The system applies machine learning to the characteristics of the resource(s) to select a data security policy for the resource(s) (Operation 204). For example, the system may apply a neural network to a set of input data associated with characteristics of a particular database, including data indicating that the particular database stores a particular type of information. The neural network may generate a particular data security policy to apply to the particular database. One example of a security policy to apply to the particular database is an encryption of a specified security level to be applied to the data in the database. The neural network may be trained to apply one level of encryption to a first set of data stored in the database based on an attribute of the first set of data. The neural network may be trained to apply another level of encryption to a second set of data stored in the database based on a different attribute of the second set of data. In addition, the system may apply a neural network to characteristics of a particular server that runs virtual machines. One of the machines may run a particular application that accesses or modifies particular data. The neural network may generate a particular data security policy for the server. For example, the neural network may identify an authorization scheme to apply to the server that would restrict access to particular data or additional servers based on authority level of the users.

According to one example embodiment, the neural network may be trained to apply different authorization schemes to different virtual machines operating on the same server. According to another example embodiment, the neural network may be trained to apply different authorization schemes to different servers running the same applications, based on different attributes associated with the servers. For example, the servers may be located in different countries, or the servers may be associated with different entities or enterprises. As another example, the system may apply a neural network to data characteristics associated with a particular server in communication with a gateway device or user terminal. The neural network may identify a particular data communication protocol to be applies to the server and the gateway device or user terminal. The neural network may be trained to apply different data communication protocols to a server based on characteristics of a gateway device in communication with the server.

According to yet another example embodiment, the system may apply the neural network to a set of input data associated with characteristics of a computing environment, such as the types of devices that comprise the computing environment, the types of applications operating in the computing environment, the communication channels within the computing environment and connected to external networks, and types of data stored by the computing environment. The neural network may identify a set of one or more policies, such as data security policies, to be applied to one or more resources of the computing environment.

According to another example embodiment, the system may perform deep reinforcement learning to identify a sequence of operations to apply to a computing environment to implement a particular set of security standards in the computing environment. According to one example embodiment, the set of security standards may be identified by the previously-described neural network. According to another example, the system may receive a user input to apply a particular data security standard in a computing environment. According to another example embodiment, the system may analyze data associated with a computing environment to identify one or more standards to apply to the computing environment. The system may perform the deep reinforcement learning by applying state information of the computing environment, including the identified characteristics of the computing environment, to a neural network acting as an agent for the deep reinforcement learning process. The neural network may select an action to apply to a present state of the computing environment to generate a next state of the computing environment. The system may apply the data characteristics associated with the next state of the computing environment to the neural network to generate a next action to apply to the next state of the computing environment. The system may repeat the process until the system generates a sequence of actions to apply to the computing environment to implement a set of data security requirements in the computing environment.

The system determines whether the data security policy is implemented in the computing resource(s) (Operation 206). For example, the system may determine that an identified data security policy has already been implemented in a particular resource. Alternatively, the system may determine that a particular resource already includes a data security policy that is stricter than the identified data security policy.

Based on determining that the data security policy is not implemented in the resource(s), the system modifies the resource(s) to comply with the data security policy (Operation 208). For example, the system may encrypt data stored in a particular resource with a particular level of data encryption. According to another example, the system may modify a set of computing resources to include a new resource. The new resource may include a firewall to filter data transmitted to a resource in the set of computing resources. The system may move a storage location for a particular type of data stored in one resource to another resource. The system may install data security software in a resource. The system may configure software in a resource to restrict access to data stored in the resource to users or entities having a particular authorization level or security key. The system may assign identifying information to users authorized to access a resource. According to another example, the system may schedule security scans of a resource.

4. USING DEEP REINFORCEMENT LEARNING TO APPLY SECURITY STANDARDS TO A COMPUTING ENVIRONMENT

Figure 3:
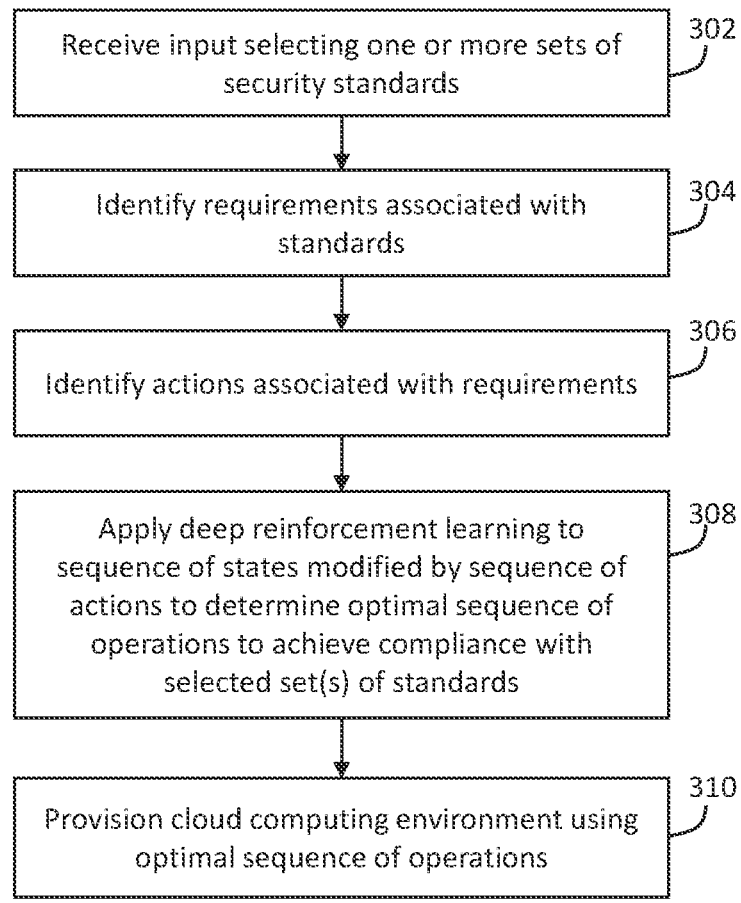
FIG. 3 illustrates an example embodiment for using deep reinforcement learning to apply security standards to a computing environments.

FIG. 3 illustrates an example set of operations for using deep reinforcement learning to apply security standards to a computing environment, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

Identify one or more sets of data security standards to apply to a computing system (Operation 302). According to one embodiment, a security standard describes a set of requirements necessary to meet the standard. According to one embodiment, the system may receive a user input selecting one or more standards to apply to computing resources in a computing environment. According to another embodiment, the system may analyze operations to be performed by a computing environment or data stored by the computing environment to identify one or more standards associated with the computing environment. For example, the system may identify the entity associated with a computing environment as a healthcare provider. The system may identify HIPAA data security standards or HITRUST data security standards to apply to the computing environment. According to another example, the system may identify payment transaction operations associated with one or more resources of a computing environment. The system may identify PCI DSS data security standards to apply to the computing environment. According to another example, the system may receive a user input to apply DFARS and FedRAMP data security standards to resources of a computing environment.

The system identifies requirements associated with the one or more sets of security standards (Operation 304). For example, if the system receives a selection associated with a HIPAA data security standard, the system identifies requirements including: ensuring access to particular stored data is password protected; authenticating particular stored data; encrypting particular stored data when the data is transmitted beyond a firewall of an internal network; generating activity logs associated with particular data; and automatically logging users off of a particular device being used to access particular data after a predetermined period of time. electronic patient health information stored in, or accessed by, a resource in the computing environment must be kept private.

According to another example, if the system receives an input to apply a DFARS data security standards to a computing environment, the system identifies requirements including: scheduling a requirements compliance check to be performed at a regular interval; implementing multifactor authentication for all local access to particular data or resources and network access to the particular data and resources; limiting access to resources in a computing environment to users having a predetermined authorization level; implementing controls for preventing access to a computing environment based on a predetermined number of unsuccessful attempts to log on to the system with incorrect passwords; installing software to detect viruses and malware in resources of the computing environment; monitor log changes in resources of the computing environment; and destroying particular data in or by a resource of the computing environment prior to re-using the resource if the resource stores the particular data and is intended to be used to store different data.

The system identifies actions associated with the requirements (Operation 306). While the system identifies the requirements of a set of security standards at one level of specificity, the system identifies the actions associated with the requirements at a higher level of specificity. For example, the system may identify a requirement of a data security standard specifying that a resource having access to a type of data must be protected by multifactor authentication. The system may identify a particular action for a particular computing environment that a particular resource in the computing environment that stores particular data of the identified data type may be protected by multifactor authentication. As another example, the system may identify a data security requirement associated with a set of standards that specifies a type of data must be encrypted during transmission outside a local network. The system may identify a particular action of installing data encryption software in a particular resource of the computing environment that has the capability to transmit particular data of the type of data identified in the data security requirement of the data security standard. According to another example, a requirement of a data security standard may specify that a local network in communication with an external network must be protected by a firewall. The system may identify a particular action of adding a firewall to a particular computing environment along a communication channel between a particular resource and an external network.

The system applies deep reinforcement learning to determine a sequence of operations for achieving compliance with the identified set(s) of security standards (Operation 308). According to an embodiment, the system applies data describing an initial state of a computing environment to a neural network trained to select an action, from among a plurality of candidate actions, to generate a next state of the computing environment. The system applies data describing the next state of the computing environment to the neural network to select a next action, from among another plurality of candidate actions, to generate another next state of the computing environment. The system repeats the operations of applying the neural network to state information describing states of the computing environment modified by a sequence of actions until the system generates a sequence of actions resulting in a target state of the computing environment that complies with the identified set(s) of data security standards.

According to one or more embodiments, the neural network trained to function as an agent in the deep reinforcement learning process to select actions based on state information of a computing environment is trained based on particular reward criteria associated with respective sequences of actions. For example, the system may train the neural network by assigning higher penalties and lower rewards to sequences of actions that take more time, consume more computing resources, or fail to comply with more data security requirements than alternative sequences of actions.

The system provisions the cloud computing environment using the sequence of operations identified by the deep reinforcement learning (Operation 210). For example, the system may identify 50 actions to be performed among 20 resources, including hardware resources and software resources implemented on the hardware resources, in a computing environment to comply with 30 requirements of a particular data security standard. The system implements the 50 actions in a particular sequence identified by the deep reinforcement learning operations.

5. TRAINING A MACHINE LEARNING MODEL TO APPLY AN ACTION-SELECTION POLICY IN A DEEP REINFORCEMENT LEARNING PROCESS

Figure 4:
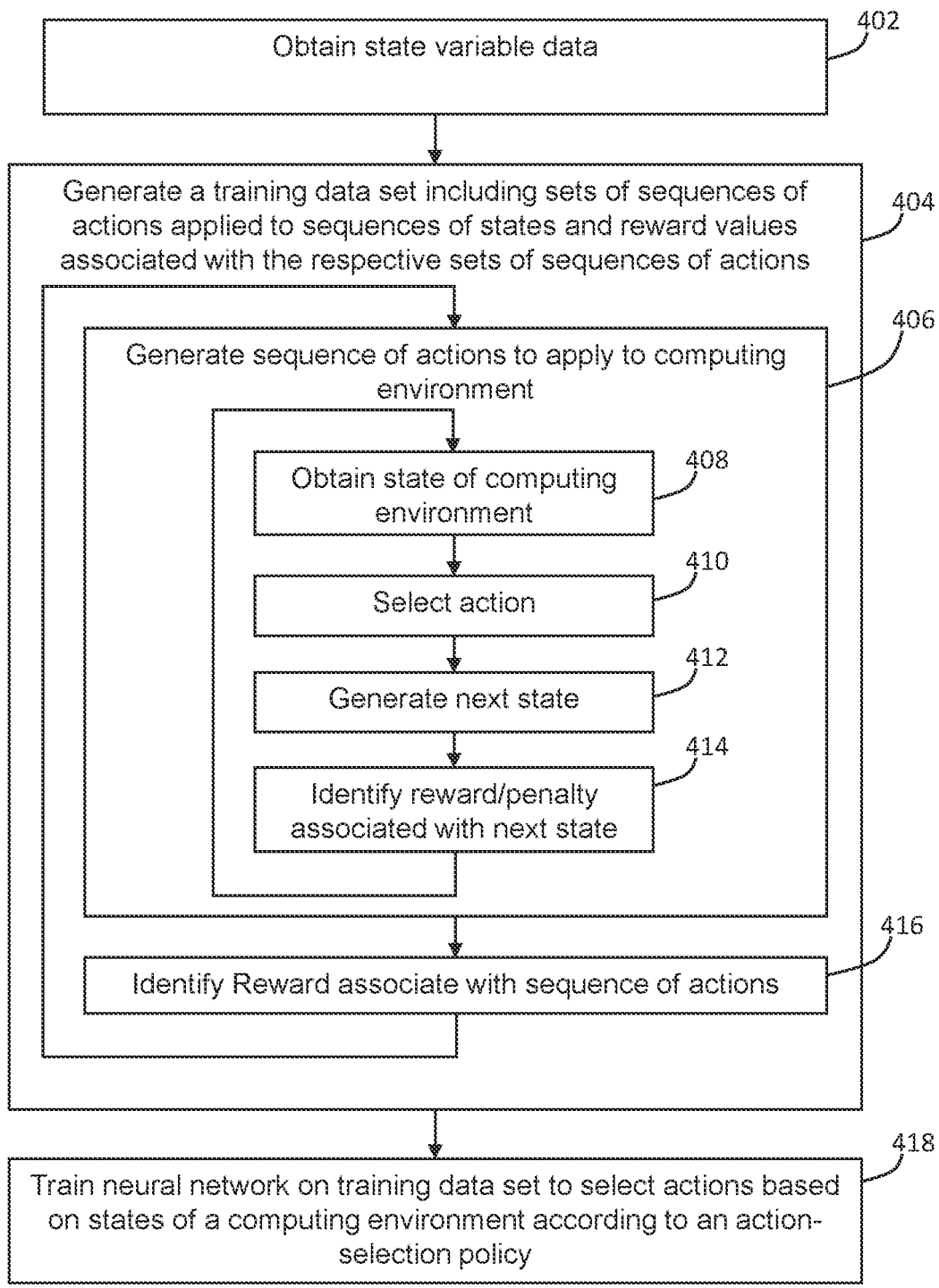
FIG. 4 illustrates an example set of operations for training a machine learning model to select actions for deep reinforcement learning in accordance with one or more embodiments.

FIG. 4 illustrates an example set of operations for training a neural network to select target actions based on state information of a computing environment to implement security standards in the computing environment, according to one or more embodiments.

A system obtains state variable data (Operation 402). The state variable data includes state information describing characteristics of resources in a computing environment. One state may describe characteristics of the resources when one resource is modified according to a data security requirement of a data security standard. Another state may describe characteristics of the resources when another resource is modified according to another data security requirement of the data security standard. For example, one state may describe characteristics of the computing environment with a particular encryption applied to data of a database. The characteristics may include the resources, such as memory, other hardware, and applications required to implement the encryption in the database, as well as characteristics of other resources that are not affected by the encryption. Another state may describe characteristics of the computing environment with particular password protocols implemented in a particular resource. The characteristics may include the resources, such as memory, other hardware, and applications required to implement the particular password protocols. Another state may describe characteristics of the computing environment with a firewall device added to the computing environment along a particular communication path between two devices.

The state variable data includes reward data and penalty data associated with particular states. Rewards and penalties are values attributed to particular states to provide feedback to an agent of a deep reinforcement learning process. A higher reward incentivizes the agent to obtain a particular state. A lower reward, or a higher penalty, disincentivizes the agent to obtain a particular state. Reward values and penalty values may be attributed to particular states based on characteristics of the states, such as: a time required to complete an action to arrive at a particular state, computing resources required for a particular state, and a number of data security requirements met by a particular state.

The system generates a training data set that includes sets of sequences of actions applied respectively to sequences of states, and reward values associated with the respective action/state pairs (Operation 404). The system generates the training data set by applying sequences of actions to sequences of states until a threshold is reached. The threshold may include a duration of time. The threshold may include a reward value. The threshold may include a bounded reward value, including an upper bound and a lower bound. For example, the system may apply a sequence of actions a respective sequence of states until a reward value associated with the sequence of states reaches a maximum value. The system may apply another sequence of actions to another respective sequence of states until a reward value associated with the sequence of states reaches a minimum value.

The system generates a sequence of actions to apply to states representing a computing environment (Operation 406) by: (a) obtaining a state representing characteristics of resources of a computing environment (Operation 408), (b) selecting an action, from among a plurality of candidate actions, to apply to the state (Operation 410), (c) applying the selected action to the state to modify the state to generate a next state (Operation 412), and (d) identifying a reward value or penalty value associated with the next state (Operation 414). The system repeats the process (a)-(d) by selecting, for the next state, another action, from among another plurality of candidate actions, to apply to the next state. The system performs (a)-(d) iteratively until a threshold is reached. In one or more embodiments, the sequence of (a)-(d) is referred to as a "step." The sequence of steps that is performed until the threshold is reached is referred to as an "episode." In one embodiment, the threshold includes a predefined number of steps. In other words, if a maximum reward value is not reached with in the predefined number of steps, the episode is completed.

For each episode, the system calculates the reward value associated with the sequence of actions that comprise the episode (Operation 416). For example, the system may assign relatively high reward values to states in which a relatively high number of requirements of a data security standard are implemented in a computing environment. Conversely, the system may assign relatively low reward values, or relatively high penalty values, to states in which a relatively low number of requirements of a data security standard are implemented in the computing environment. In addition, or in the alternative, the system may assign relatively high reward values to states that consume fewer resources, such as memory space, processing capacity, bandwidth, or functions requiring user input, than states that consume more resources. In addition, or in the alternative, the system may assign a penalty to each state, such that a sequence of actions that arrives at a particular state may be assigned a lower total reward value than another sequence of actions that arrives at the particular state with fewer actions.

The system stores a predetermined number of episodes to comprise the training data set for training the neural network. In one embodiment, the number of episodes is within a range from tens of thousands of episodes to millions of episodes.

The system trains a neural network on the training data set to select actions based on input states of a computing environment provided to the neural network (Operation 418). The system trains the neural network to embody a policy favoring sequences of actions associated with high reward values by providing, for each sequence generated by the neural network, the associated reward value as feedback to the neural network. In one or more embodiments, the system may train the neural network to implement an action-selection policy that takes into account: (a) a reward value of a candidate next state associated with a candidate action, (b) a discount factor or penalty associated with the candidate next state, and (c) an estimate of an optimal future value of future next states that follow from the particular candidate next state.

6. TRAINING A MACHINE LEARNING MODEL TO SELECT POLICIES BASED ON OPERATIONS IN A COMPUTING ENVIRONMENT

Figure 5:
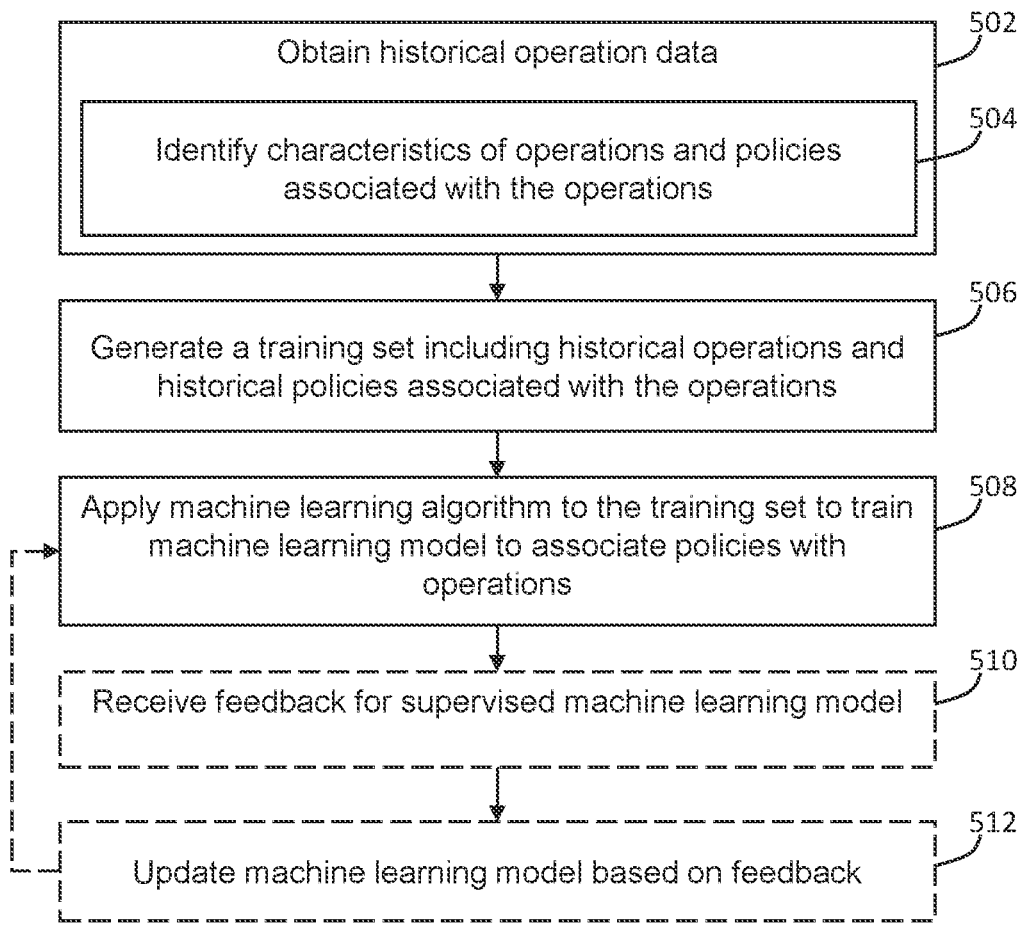
FIG. 5 illustrates an example set of operations for training a machine learning model to select policies for performing operations in a computing environment in accordance with one or more embodiments.

FIG. 5 illustrates an example set of operations for training a machine learning model to select a set of one or more policies to apply to one or more resources of a computing environment, according to one or more embodiments.

A system obtains historical operation data of one or more resources of a computing environment (Operation 502). The system identifies, in the historical operation data, characteristics of operations performed by the one or more resources and policies associated with the one or more resources for performing the operations (Operation 504). The characteristics of the operations may include, for example: a type of an operation, an application associated with the operation, an entity associated with the operation, a standard associated with the operation, and a requirement associated with the operation. For example, the system may identify characteristics in a data transfer identifying the transaction as being associated with financial information. In addition, or in the alternative, the system may identify one of the entities associated with the data transfer as being a financial institution.

The system uses the historical operation data to generate a set of training data (Operation 506). The set of training data includes, for each particular operation, a particular policy associated with the particular operation. For example, the training data identifies attributes including financial data associated with an operation. The system may identify a particular encryption type applied to the transaction, corresponding to a particular policy to encrypt financial data. According to another example, the system may detect a log-in transaction associated with an application. The system may identify a particular password security requirement associated with the log-in transaction. The password security requirement may be associated with a particular password policy. According to another example, the system may detect an operation associated with accessing patient health information in a computing environment. The system may identify a set of data security protocols, including requiring particular password security, encrypting data during transmission, and running a particular data security software program that are implemented in the computing environment. The system may identify the set of data security protocols as corresponding to a particular policy applied to the operations to be performed in the computing environment.

The system applies a machine learning algorithm to the training data set to perform an initial training of the machine learning model (Operation 508). The machine learning algorithm analyzes the training data set to train neurons of a neural network with particular weights and offsets to associate particular operations with particular policies. The particular policies may include data security policies, or any type of data storage or transmission compliance policies.

In embodiments in which the machine learning algorithm is a supervised machine learning algorithm, the system may optionally obtain feedback on the various aspects of the analysis described above (Operation 510). For example, the feedback may affirm or revise policies recommended by the machine learning model. The machine learning model may indicate that a particular operation is associated with a particular compliance policy. The system may receive feedback indicating that the particular operation should be associated with a different compliance policy. For example, the system may receive feedback that the different compliance policy should include a stricter level of compliance or compliance with a stricter standard than the policy recommended by the machine learning model.

The system updates the machine learning model based on the feedback (Operation 512). Based on associations identified by the machine learning model and/or feedback, the machine learning training set may be updated, thereby improving its analytical accuracy. Once updated, the machine learning model may be further trained by optionally applying it to additional training data sets.

7. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 6:
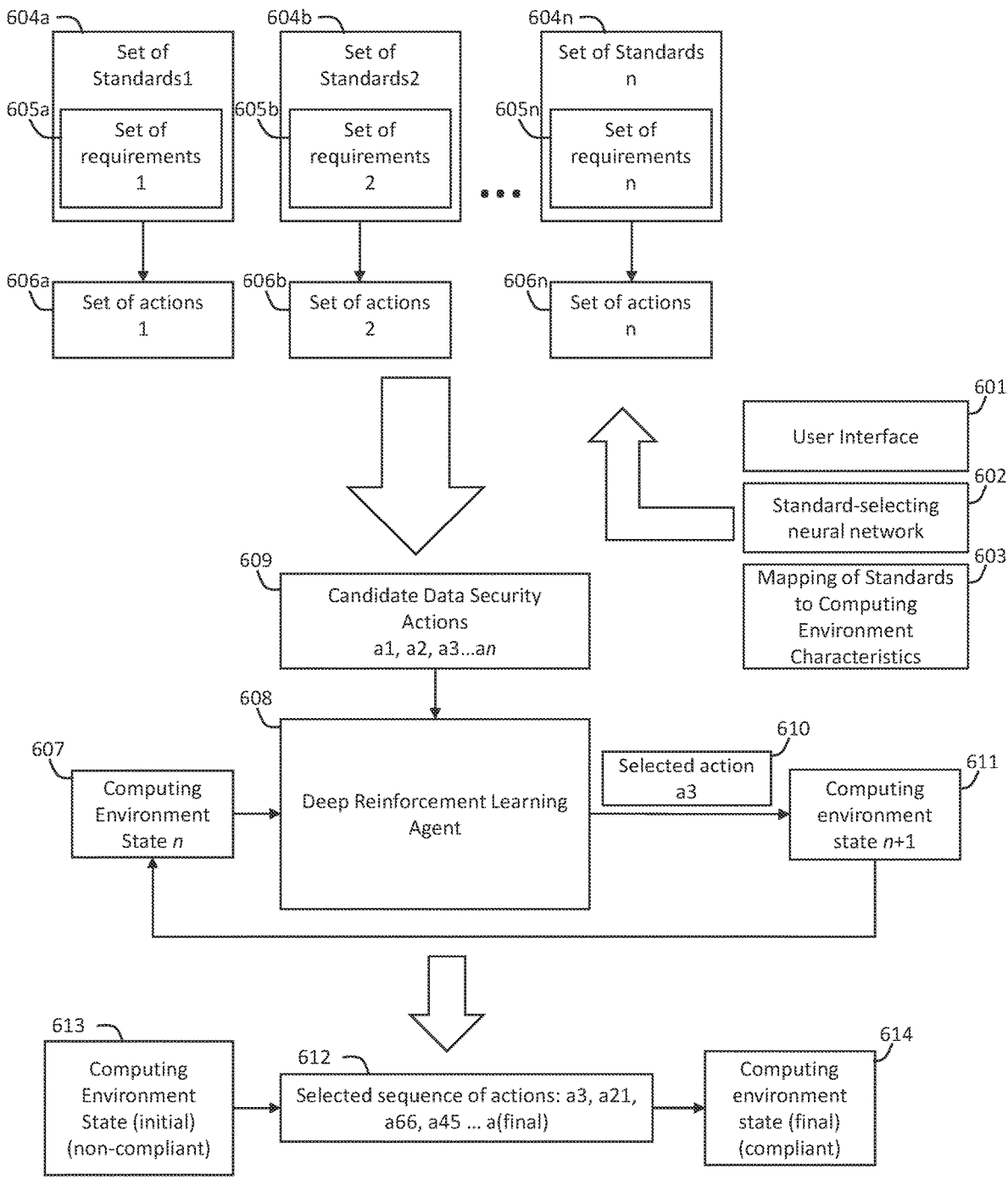
FIG. 6 illustrates an example embodiment of using deep reinforcement learning to generate a sequence of actions to apply a set of standards in an environment.

As illustrated in FIG. 6, a system selects a set of standards to apply to a computing environment. The system may receive instructions via a user interface 601 to select a particular set of standards. A standard-selecting neural network 602 may analyze operations and/or other characteristics associated with the computing environment to select one or more sets of standards to apply in the computing environment. The system may include a mapping 603 of computing environment characteristics to standards.

The system may select one or more sets of standards from among a plurality of sets of standards 604a-604n. Examples of sets of standards include standards for storing particular types of data, standards for protecting particular types of data, standards for transmitting, encrypting, and processing data, as well as standards for hardware. Examples of standards for storing and protecting data include NIST 800-171, DFARS, FedRamp, HIPAA, HITRUST, and PCI DSS. Examples of standards for transmitting data include Institute of Electrical and Electronics Engineers (IEEE) 802 standards (e.g., 802.1 through 802.12).

Each set of standards 604a-604n specifies a corresponding set of requirements 605a-605n. The requirements 605a-605n describe criteria that hardware and software elements of a computing environment must meet to comply with the associated standards 604a-604n.

Based on the selected set(s) of standards 604a-604n, the system identifies associated sets of actions 606a-606n that may be implemented in the particular computing environment. For example, if a requirement indicates that a particular type of data must be encrypted to comply with a standard, an action may be to encrypt particular data in a particular data storage resource of the computing environment, based on determining that the particular data is of the specified data type.

The system performs deep reinforcement learning to generate a sequence of operations to implement an identified set of standards in a computing environment. The system provides data describing an initial state of the computing environment 607 to a deep reinforcement learning agent 608. The deep reinforcement agent 608 may include, for example, a neural network trained to select an action from among a set of candidate actions based on information associated with a state of a computing environment.

The system provides candidate data security actions 609 to the agent 608. In the example embodiment illustrated in FIG. 6, the candidate data security actions 609 correspond to a subset of the set of actions 606b associated with the set of standards 604b. The subset of actions 609 includes the actions that may be applied to the present state (state n) of the computing environment 607. Different subsets of actions may be provided to the deep reinforcement learning agent 608 as, in the course of deep reinforcement learning, the system provides different states of the computing environment to the agent 608 as input data.

According to an example in which a set of standards 604b and requirements 605b is associated with a set of 60 actions 606b, the system may apply up to 60 different candidate actions, associated with 60 different candidate next states, to the agent 608 if the computing environment state n 607 is capable of being modified by each of the actions 606b. However, some of the actions may be applicable to one or more candidate next states, having been modified by one or more previously-selected actions. These actions may not be applicable to the computing environment state n 607. Accordingly, the system may apply one subset of actions 606b to the agent 608 based on one computing environment state being provided to the agent 608 as input data. The system may apply another subset of actions 606b to the agent 608 based on another computing environment state being provided to the agent 608 as input data. The subsets of actions may not be coextensive.

According to one or more embodiments, the system identifies reward values associated with all possible actions that may be applied to a particular input state of the computing environment and provides the agent 608 with a predetermined number of candidate actions associated with candidate states having a highest reward value. For example, the system may provide the agent 608 with four candidate actions from among 60 possible candidate actions based on the four candidate actions being associated with the highest reward values. In addition, or in the alternative, the system may provide the agent 608 with a predetermined number of candidate actions based on one or more factors, in addition to reward values, such as: a discount factor or penalty associated with the candidate next state, and an estimate of an optimal future value of future next states that follow from the particular candidate next state.

The agent 608 selects an action 610 from among the candidate data security actions 609 according to an action-selection policy. The action-selection policy may perform a calculation to arrive at a selection based on: (a) a reward value of a candidate next state associated with a candidate action, (b) a discount factor or penalty associated with the candidate next state, and (c) an estimate of an optimal future value of future next states that follow from the particular candidate next state.

The system applies the selected action 610 to the present state (state n) of the computing environment 607 to generate a next state (state n+1) 611 of the computing environment. The system provides the next state 611, and another set of candidate data security actions that may be performed on the next state 611, to the agent 608. The agent 608 repeats the process of selecting actions from among candidate actions to apply to the state of the computing environment to generate a subsequent state of the computing environment, until the agent generates a final sequence of actions 612. The final sequence of actions 612 selected by the agent 608 modifies the initial state (state n) of the computing environment 613, which is not compliant with identified sets of standards 604a-604n to generate a final state of the computing environment 614 that is compliant with the system-selected sets of standards, from among the plurality of sets 604a-604n.

8. COMPUTER NETWORKS AND CLOUD NETWORKS

In one or more embodiments, an environment provisioning platform may be implemented in a computer network that provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, multiple tenants may share the database.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
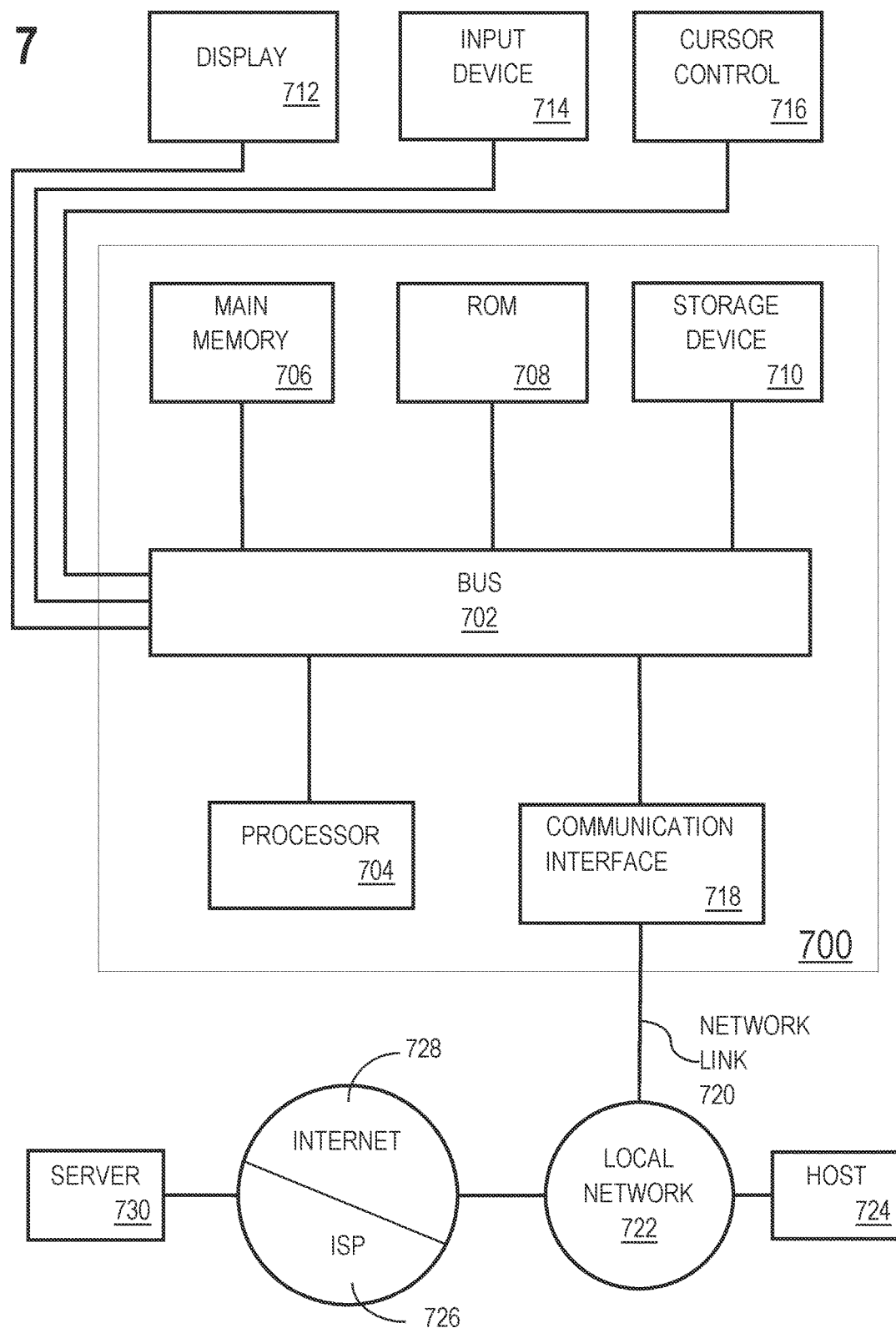
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors cause performance of operations comprising:
   obtaining a set of data representing a computing environment, the computing environment comprising a first set of computing resources;
   receiving a selection to implement a first set of data security standards in the computing environment;
   identifying a first set of security requirements, associated with the first set of data security standards, for the first set of computing resources;
   performing deep reinforcement learning to generate a target sequence of actions for implementing the first set of data security standards in the computing environment, at least by:
   iteratively (a) applying a plurality of candidate actions, associated with a respective plurality of security requirements, from among the first set of security requirements, to a current candidate state of the computing environment to generate a plurality of next candidate states of the computing environment,
   (b) identifying a plurality of candidate reward values associated respectively with the plurality of next candidate states of the computing environment, and
   (c) applying a target action, from among the plurality of candidate actions, to the current candidate state to generate a target next candidate state of the computing environment and a target reward associated with the target next candidate state; and
   generating the target sequence of actions based on a set of target rewards associated with a particular set of target next candidate states resulting from performing the target sequence of actions; and
   executing the target sequence of actions to provision the computing environment according to the first set of data security standards.

2. The non-transitory computer readable medium of claim 1, wherein applying the target action to the current candidate state to generate the target next candidate state of the computing environment comprises:
   applying, by a deep reinforcement learning agent, a policy to the plurality of candidate actions and the plurality of candidate reward values to identify the target action from among the plurality of candidate actions.

3. The non-transitory computer readable medium of claim 2, wherein the deep reinforcement learning agent includes a neural network,
   wherein applying the policy to the plurality of candidate actions and the plurality of candidate reward values comprises:
   applying the neural network to (a) the current candidate state, (b) the plurality of candidate actions, and (c) the plurality of candidate reward values to identify the target action from among the plurality of candidate actions.

4. The non-transitory computer readable medium of claim 1, wherein the plurality of candidate actions correspond to a respective plurality of modifications to the first set of computing resources, the plurality of modifications comprising at least one of:
   encrypting data stored in a first particular resource with a particular level of data encryption;
   modifying the first set of computing resources to include a new resource, the new resource including a firewall to filter data transmitted to at least one resource in the first set of computing resources;
   moving a storage location for a particular type of data stored in the first set of computing resources to a second particular resource;
   installing a particular security software in a third particular resource;
   configuring software in a fourth particular resource to restrict access to data stored in the fourth particular resource;
   assigning particular identifying information to users authorized to access a fifth particular resource; and
   scheduling security scans of a sixth particular resource.

5. The non-transitory computer readable medium of claim 1, wherein the sets of data security standards comprise at least one of:
   Health Insurance Portability and Accountability Act (HIPAA) security standards;
   Payment Card Industry Data Security Standard (PCI DSS) security standards;

National Institute of Standards and Technology (NIST) 800-171 security standards;
Defense Federal Acquisition Regulation Supplement (DFARS) security standards;
Health Information Trust Alliance (HITRUST) security standards; and
Federal Risk and Authorization Management Program (FedRAMP) security standards.

6. The non-transitory computer readable medium of claim 1, wherein the operations further comprise:
receiving a selection to implement a second set of data security standards that is not coextensive with the first set of data security standards,
wherein the plurality of candidate reward values includes a first reward value associated with (a) a first next candidate state, (b) a first requirement in the first set of data security standards, and (c) a second requirement in the second set of data security standards,
wherein the plurality of candidate reward values includes a second reward value associated with (a) a second next candidate state, and (b) the first requirement in the first set of data security standards,
wherein the second next candidate state is not associated with any requirement in the second set of data security standards, and
wherein the first reward value is greater than the second reward value.

7. The non-transitory computer readable medium of claim 1, wherein applying the target action to the current candidate state to generate the target next candidate state of the computing environment comprises:
applying, by a deep reinforcement learning agent, a policy to the plurality of candidate actions and the plurality of candidate reward values to identify the target action from among the plurality of candidate actions,
wherein the deep reinforcement learning agent includes a neural network,
wherein applying the policy to the plurality of candidate actions and the plurality of candidate reward values comprises:
applying the neural network to (a) the current candidate state, (b) the plurality of candidate actions, and (c) the plurality of candidate reward values to identify the target action from among the plurality of candidate actions,
wherein the plurality of candidate actions correspond to a respective plurality of modifications to the first set of computing resources, the plurality of modifications comprising at least one of:
encrypting data stored in a first particular resource with a particular level of data encryption;
modifying the first set of computing resources to include a new resource, the new resource including a firewall to filter data transmitted to at least one resource in the first set of computing resources;
moving a storage location for a particular type of data stored in the first set of computing resources to a second particular resource;
installing a particular security software in a third particular resource;
configuring software in a fourth particular resource to restrict access to data stored in the fourth particular resource;
assigning particular identifying information to users authorized to access a fifth particular resource; and
scheduling security scans of a sixth particular resource,
wherein the sets of data security standards comprise at least one of:
Health Insurance Portability and Accountability Act (HIPAA) security standards;
Payment Card Industry Data Security Standard (PCI DSS) security standards;
National Institute of Standards and Technology (NIST) 800-171 security standards;
Defense Federal Acquisition Regulation Supplement (DFARS) security standards;
Health Information Trust Alliance (HITRUST) security standards; and
Federal Risk and Authorization Management Program (FedRAMP) security standards,
wherein the operations further comprise:
receiving a selection to implement a second set of data security standards that is not coextensive with the first set of data security standards,
wherein the plurality of candidate reward values includes a first reward value associated with (a) a first next candidate state, (b) a first requirement in the first set of data security standards, and (c) a second requirement in the second set of data security standards,
wherein the plurality of candidate reward values includes a second reward value associated with (a) a second next candidate state, and (b) the first requirement in the first set of data security standards,
wherein the second next candidate state is not associated with any requirement in the second set of data security standards, and
wherein the first reward value is greater than the second reward value.

8. A method comprising:
obtaining a set of data representing a computing environment, the computing environment comprising a first set of computing resources;
receiving a selection to implement a first set of data security standards in the computing environment;
identifying a first set of security requirements, associated with the first set of data security standards, for the first set of computing resources;
performing deep reinforcement learning to generate a target sequence of actions for implementing the first set of data security standards in the computing environment, at least by:
iteratively (a) applying a plurality of candidate actions, associated with a respective plurality of security requirements, from among the first set of security requirements, to a current candidate state of the computing environment to generate a plurality of next candidate states of the computing environment, (b) identifying a plurality of candidate reward values associated respectively with the plurality of next candidate states of the computing environment, and (c) applying a target action, from among the plurality of candidate actions, to the current candidate state to generate a target next candidate state of the computing environment and a target reward associated with the target next candidate state; and
generating the target sequence of actions based on a set of target rewards associated with a particular set of target next candidate states resulting from performing the target sequence of actions; and
executing the target sequence of actions to provision the computing environment according to the first set of data security standards.

9. The method of claim 8, wherein applying the target action to the current candidate state to generate the target next candidate state of the computing environment comprises:

applying, by a deep reinforcement learning agent, a policy to the plurality of candidate actions and the plurality of candidate reward values to identify the target action from among the plurality of candidate actions.

10. The method of claim 9, wherein the deep reinforcement learning agent includes a neural network, wherein applying the policy to the plurality of candidate actions and the plurality of candidate reward values comprises:

applying the neural network to (a) the current candidate state, (b) the plurality of candidate actions, and (c) the plurality of candidate reward values to identify the target action from among the plurality of candidate actions.

11. The method of claim 8, wherein the plurality of candidate actions correspond to a respective plurality of modifications to the first set of computing resources, the plurality of modifications comprising at least one of:

encrypting data stored in a first particular resource with a particular level of data encryption;

modifying the first set of computing resources to include a new resource, the new resource including a firewall to filter data transmitted to at least one resource in the first set of computing resources;

moving a storage location for a particular type of data stored in the first set of computing resources to a second particular resource;

installing a particular security software in a third particular resource;

configuring software in a fourth particular resource to restrict access to data stored in the fourth particular resource;

assigning particular identifying information to users authorized to access a fifth particular resource; and scheduling security scans of a sixth particular resource.

12. A system comprising:

one or more processors; and memory storing instructions that, when executed by the one or more processors, cause the system to perform operations comprising:

obtaining a set of data representing a computing environment, the computing environment comprising a first set of computing resources;

receiving a selection to implement a first set of data security standards in the computing environment;

identifying a first set of security requirements, associated with the first set of data security standards, for the first set of computing resources;

performing deep reinforcement learning to generate a target sequence of actions for implementing the first set of data security standards in the computing environment, at least by:

iteratively (a) applying a plurality of candidate actions, associated with a respective plurality of security requirements, from among the first set of security requirements, to a current candidate state of the computing environment to generate a plurality of next candidate states of the computing environment, (b) identifying a plurality of candidate reward values associated respectively with the plurality of next candidate states of the computing environment, and (c) applying a target action, from among the plurality of candidate actions, to the current candidate state to generate a target next candidate state of the computing environment and a target reward associated with the target next candidate state; and generating the target sequence of actions based on a set of target rewards associated with a particular set of target next candidate states resulting from performing the target sequence of actions; and executing the target sequence of actions to provision the computing environment according to the first set of data security standards.

13. The system of claim 12, wherein applying the target action to the current candidate state to generate the target next candidate state of the computing environment comprises:

applying, by a deep reinforcement learning agent, a policy to the plurality of candidate actions and the plurality of candidate reward values to identify the target action from among the plurality of candidate actions.

14. The system of claim 13, wherein the deep reinforcement learning agent includes a neural network, wherein applying the policy to the plurality of candidate actions and the plurality of candidate reward values comprises:

applying the neural network to (a) the current candidate state, (b) the plurality of candidate actions, and (c) the plurality of candidate reward values to identify the target action from among the plurality of candidate actions.

* * * * *